(12) United States Patent
Musick, Jr. et al.

(10) Patent No.: US 9,007,299 B2
(45) Date of Patent: Apr. 14, 2015

(54) MOTION CONTROL USED AS CONTROLLING DEVICE

(75) Inventors: Charles Musick, Jr., Belmont, CA (US);
Robert Kay, San Francisco, CA (US);
Stuart Reynolds, San Francisco, CA (US); Dana Wilkinson, Mountain View, CA (US); Anupam Chakravorty, Mountain View, CA (US); William Robert Powers, III, San Francisco, CA (US); Wei Yen, Seattle, WA (US);
Youding Zhu, Sunnyvale, CA (US)

(73) Assignee: AiLive Inc., Sunnyvale, CA (US)

( * ) Notice: Subject to any disclaimer, the term of this patent is extended or adjusted under 35 U.S.C. 154(b) by 459 days.

(21) Appl. No.: 13/249,251

(22) Filed: Sep. 30, 2011

(65) Prior Publication Data

US 2012/0256835 A1    Oct. 11, 2012

Related U.S. Application Data

(63) Continuation-in-part of application No. 12/709,523, filed on Feb. 22, 2010, which is a continuation-in-part of application No. 12/020,431, filed on Jan. 25, 2008, and a continuation-in-part of application No. 11/486,997, filed on Jul. 14, 2006, now Pat. No. 7,702,608.

(60) Provisional application No. 61/500,581, filed on Jun. 23, 2011.

(51) Int. Cl.
*G09G 5/00* (2006.01)
*A63F 13/20* (2014.01)
*A63F 13/40* (2014.01)
*G06F 3/01* (2006.01)
*G06F 3/0346* (2013.01)
*G06F 3/038* (2013.01)
*G06K 9/00* (2006.01)
*G06K 9/62* (2006.01)
*G01C 21/36* (2006.01)

(52) U.S. Cl.
CPC .......... *A63F 13/06* (2013.01); *A63F 13/10* (2013.01); *A63F 2300/1018* (2013.01); *A63F 2300/1043* (2013.01); *A63F 2300/105* (2013.01); *A63F 2300/1075* (2013.01); *A63F 2300/6027* (2013.01); *A63F 2300/6045* (2013.01); *G06F 3/017* (2013.01); *G06F 3/0346* (2013.01); *G06F 3/038* (2013.01); *G06K 9/00335* (2013.01); *G06K 9/6253* (2013.01); *G01C 21/3664* (2013.01)

(58) Field of Classification Search
USPC ......... 345/156, 158, 161, 163, 173, 157, 169; 463/36, 7, 37; 715/863
See application file for complete search history.

(56) References Cited

U.S. PATENT DOCUMENTS 6,844,871 B1* 1/2005 Hinckley et al. ............... 345/163
2003/0193572 A1* 10/2003 Wilson et al. ............ 348/207.99

(Continued)

*Primary Examiner* — Koosha Sharifi-Tafreshi
(74) *Attorney, Agent, or Firm* — Joe Zheng

(57) ABSTRACT

Techniques for using a motion sensitive device as a controller are disclosed. A motion controller as an input/control device is used to control an existing electronic device (a.k.a., controlled device) previously configured for taking inputs from a pre-defined controlling device. The signals from the input device are in a different form from the pre-defined controlling device. According to one aspect of the present invention, the controlled device was designed to respond to signals from a pre-defined controlling device (e.g., a touch-screen device). The inputs from the motion controller are converted into touch-screen like signals that are then sent to the controlled device or programs being executed in the controlled device to cause the behavior of the controlled device to change or respond thereto, without reconfiguration of the applications running on the controlled device.

62 Claims, 10 Drawing Sheets

(56) References Cited

U.S. PATENT DOCUMENTS

| | | |
|---|---|---|
| 2005/0119036 A1* | 6/2005 | Albanna et al. .................. 463/7 |
| 2005/0221893 A1* | 10/2005 | Ohta ............................... 463/36 |
| 2007/0247435 A1* | 10/2007 | Benko et al. .................. 345/173 |
| 2008/0042973 A1* | 2/2008 | Zhao et al. .................... 345/156 |
| 2008/0070684 A1* | 3/2008 | Haigh-Hutchinson ......... 463/32 |
| 2009/0231425 A1* | 9/2009 | Zalewski ....................... 348/142 |
| 2013/0023341 A1* | 1/2013 | Yamanouchi .................. 463/31 |

* cited by examiner

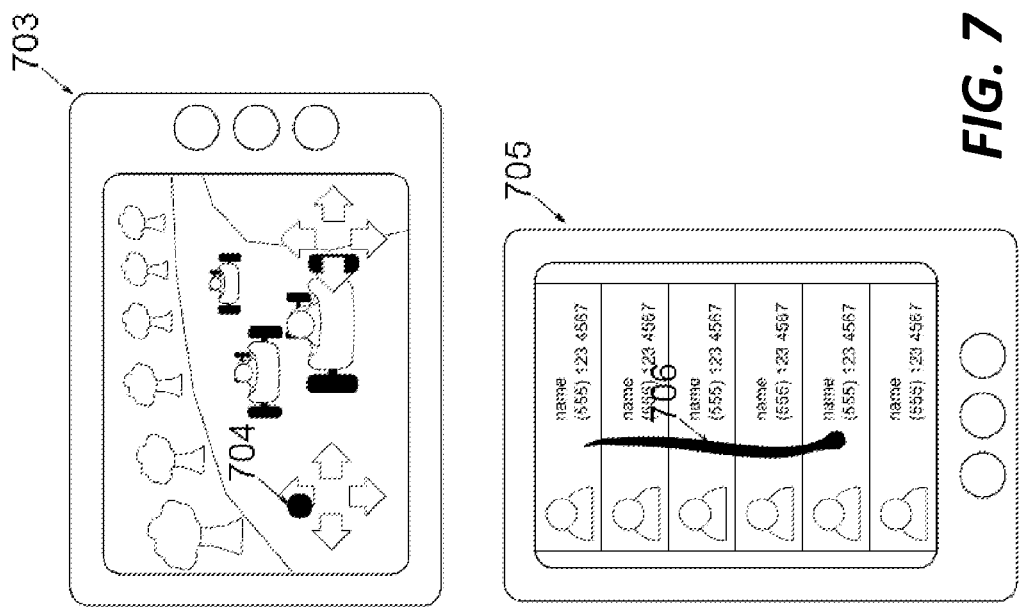
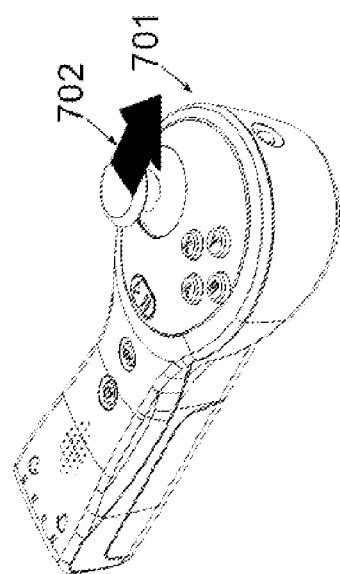
FIG. 7

Mapping from successive positions for a controller 1001 in 3D space to sucessive points on a 2D plane 1002

MOTION CONTROL USED AS CONTROLLING DEVICE

CROSS REFERENCE TO RELATED APPLICATIONS

This application claims the benefits of the provisional application No. 61/500,581, entitled "Motion control used as controlling device", filed Jun. 23, 2011, which is hereby incorporated by reference for all purposes. This application is a continuation-in-part of co-pending U.S. application Ser. No. 12/709,523, entitled "Systems and methods for utilizing personalized motion control in virtual environment", filed Feb. 22, 2010, which is a continuation-in-part of U.S. application Ser. No. 11/486,997, entitled "Generating Motion Recognizers for Arbitrary Motions", filed Jul. 14, 2006, now U.S. Pat. No. 7,702,608, and co-pending U.S. application Ser. No. 12/020,431, entitled "Self-Contained Inertial Navigation System for Interactive Control Using Movable Controllers", filed Jan. 25, 2008, which is a continuation-in-part of U.S. application Ser. No. 11/486,997, filed Jul. 14, 2006, entitled "Generating Motion Recognizers for Arbitrary Motions", now U.S. Pat. No. 7,702,608, and U.S. application Ser. No. 11/820,207, filed Jun. 18, 2007, entitled "Self-contained Inertial navigation system for interactive control using movable controllers", now U.S. Pat. No. 7,636,645. This application is also a continuation-in-part of co-pending U.S. application Ser. No. 13/105,863, entitled "Method and system for tracking motion-sensing device", filed May 11, 2010, which is a continuation-in-part of co-pending U.S. application Ser. No. 12/935,750, entitled "Method and system for controlling objects within a virtual environment", filed on Jul. 14, 2010, which is a continuation-in-part of co-pending U.S. application Ser. No. 12/020,431, entitled "Self-Contained Inertial Navigation System for Interactive Control Using Movable Controllers", which claims the priority of a provisional application Ser. No. 60/990,898, filed Nov. 28, 2007, and is a continuation-in-part of U.S. application Ser. No. 11/486,997, filed Jul. 14, 2006, now U.S. Pat. No. 7,702,608.

BACKGROUND OF THE INVENTION

1. Field of Invention

The invention is generally related to the area of man machine interface for electronic devices, and more particularly:
  1) related to transformation of motion sensor, joystick, buttons and camera-derived signals to replace or modify signals from touch-screen devices;
  2) related to providing alternative techniques of user inputs to a device that is originally provided or designed to receive inputs from another device; and
  3) related to the configuration, reconfiguration and dynamic choice of the transformation of alternative input signals into a set of customary signals and commands for an existing device or applications or modules running on the device, based upon a contextual identifier.

2. Description of Related Art

In the industrial design of man-machine interaction, user interface is a space where interaction between humans and machines occurs. The goal of man-machine interaction is to produce a user interface which makes it easy, efficient, and enjoyable to operate a machine in the way which produces the desired result. This generally means that an operator needs to provide minimal input to achieve the desired output, and also that the machine minimizes undesired outputs to the human. The design considerations applicable when creating practical user interfaces are related to or involve such disciplines as ergonomics and psychology.

A touch-screen is one of the most successful man-machine interfaces ever designed and is mostly commonly seen on many electronic devices. They are present in devices such as computers, tablets, and smart phones. A touch-screen is an electronic visual display that can detect the presence and location of a touch within the display area of the touch-screen. The term generally refers to touching the display of the device with a finger or hand. A touch-screen device can also sense other passive objects, such as a stylus.

In some applications, it is desired to control a touch-screen device through the use of a hand-held motion sensitive controller including a combination of the following sensors:
  1) accelerometers;
  2) gyroscopes;
  3) electronic compasses or magnetometers;
  4) buttons;
  5) joysticks;
  6) microphones,
and transmitters:
  1) light emitting diodes;
  2) wireless communication devices.

It may be desirable to connect a touch-screen controlled device to a large-screen television and control some or all of its functions from the comfort of a couch while the graphical output of the device is displayed on the large screen. In this case, a desirable interaction with the device is not the touch-screen of the device, but the alternate (non-touch-screen) input device. However, modules (e.g., software components) running on the controlled device may need to receive touch-surface-like signals (or signals customarily derived from touch-surface-like signals) in order to control their functions.

SUMMARY

This section summarizes some aspects of the present disclosure and briefly introduces some preferred embodiments. Simplifications or omissions in this section as well as in the abstract or the title of this description may be made to avoid obscuring the purpose of this section, the abstract and the title. Such simplifications or omissions are not intended to limit the scope of the present disclosure.

Generally speaking, this invention describes techniques for using a motion sensitive device (controller) as an input/control device for an existing electronic device (a.k.a., controlled device) previously configured for taking inputs from a pre-defined controlling device. The signals from the input device are in a different form from the pre-defined controlling device. According to one aspect of the present invention, the controlled device was designed to respond to signals from a touch screen or touch screen-like signals. Examples of these controlled devices include but are not limited to smart phones and tablet PCs that may be electronically connected to a large display. The inputs from the motion controller are converted into touch-screen like signals that are then sent to the controlled device or programs being executed in the controlled device to cause the behavior of the controlled device to change or respond thereto, without reconfiguration of the applications running on the controlled device.

According to another aspect of the present invention, signals from the motion controller include sensor signals some or all of which are generated from inertial sensors enclosed in the motion controller. The signals are converted to a set of control signals including some signals substantially similar to the signals from a touch-screen device to subsequently control the controlled device. Depending on implementation, the control signals may include translational and angular positions of the motion controller with respect to the controlled device, and a series of interactions by a user with the motion controller. In one case, the control signals may include output signals from other motion controllers (used by the same user or a different user)

The present invention may be implemented as a method, an apparatus of a part of a device or a software module to be executed in a designated device. According to one embodiment, the present invention is a system for motion-based control of a controlled device, the system comprises a motion sensitive device including a plurality of sensors generating sensor signals responsive to motion of the motion sensitive device, the sensor signals being sufficient to estimate positions and orientations of the motion sensitive device in six degrees of freedom; at least one application preconfigured to be responsive to touch-screen input signals from a touch-screen device; and a processing unit configured to facilitate the motion sensitive device to control the at least one application on the controlled device by converting a first set of signals from the motion sensitive device to a part of a second set of signals, the second set of signals including some signals substantially similar to the touch-screen input signals from the touch-screen device, wherein the first set of signals includes the sensor signals.

According to another embodiment, the present invention is a method for motion-based control of a controlled device, the method comprises receiving a first set of sensor signals from sensors in a motion sensitive device, the sensor signals being sufficient to estimate positions and orientations of the motion sensitive device in six degrees of freedom; receiving a second set of sensor signals from a secondary sensor that provides a fixed frame of reference; determining from the first and second sets of signals pointing locations of the motion sensitive device relative to the fixed frame of reference; and producing a set of control signals from a transformation to control the controlled device, wherein the transformation is configured to transform at least some of the control signals to substantially similar to input signals from a predefined device provided to control the controlled device.

One of the objects, advantages and benefits of the present invention is to enable an alternative device (e.g., a motion controller) to control a controlled device originally designed to be working with a predefined device (e.g., a touch-screen device).

Other objects, advantages and benefits of the present disclosure will become more apparent from the following detailed description of preferred embodiment when taken in conjunction with the accompanying drawings.

BRIEF DESCRIPTION OF THE FIGURES

These and other features, aspects, and advantages of the present invention will become better understood with regard to the following description, appended claims, and accompanying drawings where:

FIG. 7 shows a motivating example for why the same input signal may want to be transformed in a context-dependent manner;

DETAILED DESCRIPTION OF THE INVENTION

Figure 1:
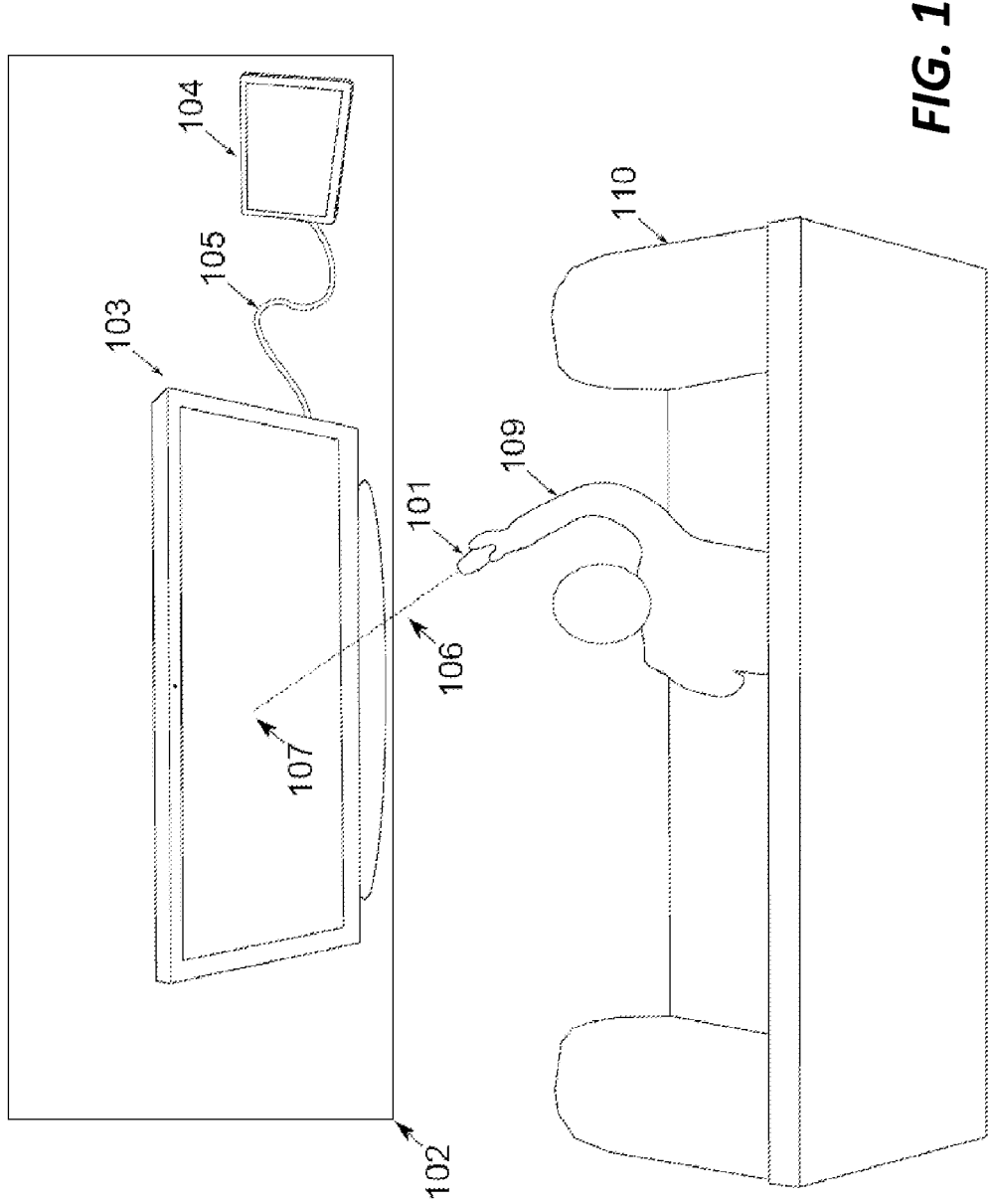
FIG. 1 shows various components in a configuration, according to an embodiment of the invention, in which a motion controller, a display, and one of more touch surface devices are illustrated.

The detailed description of the invention is presented largely in terms of procedures, steps, logic blocks, processing, and other symbolic representations that directly or indirectly resemble the operations of data processing devices. These process descriptions and representations are typically used by those skilled in the art to most effectively convey the substance of their work to others skilled in the art. Numerous specific details are set forth in order to provide a thorough understanding of the present invention. However, it will become obvious to those skilled in the art that the invention may be practiced without these specific details. In other instances, well known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

At numerous points in the following descriptions, reference will be made to motion sensors. Motion sensors herein include but are not limited to accelerometers, gyroscopes, and electronic compasses (magnetometers), or a combination of motion sensors.

A (user) input device is a control device that allows a user to interactively control the functions of another device. Some common examples of the control device include: mice, keyboards, joysticks, touch sensitive surfaces, motion controllers (such as the Wii Remote™, or PlayStation Move controller, and air mice) and television controllers. Passive sensors, such as video cameras and microphones are also examples of user input devices.

As a result of the actions from the user, signals are transmitted from the user input device to a controlled device in order to cause a change in the behavior of the controlled device. There are many examples of controlled devices. Some common examples include: video game systems, televisions, digital video recorders (DVRs), DVD players, video cassette recorders, personal computers, laptop computers, tablet computers, home audio systems, cell phones, smart phones, personal music players, graphical displays, and projected graphics systems. Commonly, these controlled devices run modules (e.g., software components) that receive signals from input devices, or indirectly process or transform signals received from the input devices. Some examples of such software components include: applications, games, operating systems, drivers, firmware, kernels, user interface (APIs), and etc. These software components are configured to 'listen for and respond to signals of specific types. Broadly, these signals may be categorized as either:

1) representative of a type of input device, some examples include:
   a. "mouse-like" signals originating from a "mouse-like" device (e.g., a computer mouse);
   b. "keyboard-like" signals originating from a "keyboard-like" device (e.g., a remote keyboard or a displayed keyboard); and
   c. "touch-surface-like" signals originating from a "touch-surface-like" device (e.g., a touchpad).

More broadly, these devices may be categorized by type and designed to listen for, and respond to, signals of specific types. In this way, a device, such as a trackball, may be used in place of a mouse by implementing a communication protocol (such as USBS 1.1) through which it is indicated that the device is "mouse-like" and subsequently provides "mouse-like" button-presses and change of position signals.

2) representative of higher level signals, or signals representing control requests or control events of specific types. Some examples include:
   a. "Next Slide [requested]";
   b. "Scroll Up [requested]";
   c. "Zoom In [requested]".

As a result of the actions by a user, signals are transmitted from the user input device to a controlled device in order to cause a change in the behavior of the controlled device. Commonly, these abstract signals are provided as a convenience to application programmers who are freed from having to consider a large variety of possible input devices. In this way it is possible, by the implementation of a software component (such as a "driver"), to map signals from new alternative input devices providing new (a-priori unknown) categories of input signal into the "listened-for" signals expected by the software components. In this way, the provision is made by operating system makers or API developers to write and install software components that output signals received from a conceivable source and subsequently use the signals to control existing applications.

However, these existing models do not solve our problem in a satisfactory manner. Applications are usually written to 'listen-for' signals of a particular type (e.g. "touch-surface-like"). For example, in the case of the Android operating system, there are many applications that have been written for it. Presently, the majority of Android devices use a touch-screen as the primary mode of user input, and applications (and other software components) are often written specifically to 'listen-for' touch-surface-like signals.

If one wishes to control all the touch-surface functions of the controlled device using a new, non "touch-surface-like" input device, such as a motion sensitive device or controller, there are practical problems that must be overcome:

1. Many software components are written to "listen-for" and respond specifically to "touch-surface-like" signals. Similarly, software components may be written to "listen-for" higher level signals, such as "Zoom-In" or "Scroll-Down" signals which are generated indirectly by additional software components (such as an operating systems, drivers, APIs, etc. . . . ) similarly expecting (or "listening for") "touch-surface-like" signals. The type of acceptable and expected input may be coupled into existing software components by various means including:
   a. its design;
   b. through the use of a compiler; or
   c. through its dependence upon one or more additional software components (e.g.: a driver, operating system, APIs).

These input devices may not be "touch-surface-like" devices or readily provide "touch-surface-like" signals. In particular, according to one embodiment, none of the sensors in an input device directly or obviously provide touch-surface-like signals. Their application and use in lieu of a touch-surface-like input device is therefore not easily implemented or conceived of.

One aspect of this invention is related to the transformation of sensor signals from the input device into touch-surface-like signals. Touch-surface-like signals contain information representing 2D coordinates on a 2D surface. In one embodiment, the inventors use an input device to point directly at items shown on a graphical display and estimate the pointed position (being the intersection of the major axis of the device and the graphical display). Such estimation of the pointed position is referred to as 'drift-free' 'down-the-barrel' pointing. Drift-free down-the-barrel pointing signals are a suitable source of 'touch-screen-like' signals because a user can directly correlate the position of orientation of a hand-held device with a position and orientation on a display without the need for graphical feedback (such as a graphical mouse-pointer, crosshair or cursor).

Some of the objects, benefits and advantages of the present invention include:

a. In the case of a mouse-like device, a mouse is not capable of providing "down the barrel" pointing signals as mouse-like devices provide a measure of linear velocity in a 2D plane but not an absolute position on 2D plane. Additionally, a mouse provides "mouse-like-signals" received by applications listening for "mouse-like-signals". A source of such "mouse-like-signals" may not directly be used with software listening for "touch-surface-like" signals. Furthermore, a user cannot reliably correlate the physical position of a mouse with a position on a graphical display without the use of graphical feedback (e.g. a mouse-pointer);

b. Further to the need for graphical feedback, mouse-like-devices (devices providing sources of mouse signals) also differ in that they are a source of a single stream of 2D values, whereas multi-touch surfaces may generate multiple streams of 2D values. One aspect of this invention is the use of a controlling device contemplated in the present invention to provide multi-touch-like signals.

c. In the case of an air mouse, a point on a plane is determined through the integration over time of angular orientation signals from a gyroscope to obtain a relative measure of the angular position. This measure is subsequently transformed into a point on a 2D plane. Drawbacks of this approach are that:
   i. the calculated orientation signals are only measured relative to some starting orientation; and
   ii. the integration of observed relative measures to obtain an absolute measure suffers from increasing errors over time (an artifact known as deduced reckoning error).

After an initial calibration step, such as the measurement of the orientation of the input device while the device is pointed at a graphical display, it may be initially possible to provide down-the-barrel pointing. However, over-time, due to the above drawbacks, the accumulation of deduced reckoning errors (or "drift"), or other limitations of the device sensors (such as railing ("maxing out"), scaling errors, non-linearity, or offset errors) mean that calculated orientation of the device may eventually be misaligned with its actual orientation. These drawbacks make gyroscope air-mouse devices unsuitable for applications in which one would like "drift free" "down-the-barrel pointing" without the need for graphical feedback. In one embodiment, an input device is configured to overcome the limitation by continuous recalibration with respect to a fixed reference. In one embodiment, the fixed reference is an electronic compass. In another embodiment, the fixed reference is an external camera. Furthermore, while it has already been conceived that a motion sensitive device may be able to provide mouse-like signals, it has not been previously conceived that such a device can provide usable "touch-surface-like" signals (which among other attributes, represent absolute positions on a 2D surface) which are qualitatively different from "mouse-like" signals (e.g., 2D velocity). "Touch-surface-like" signals have additional characteristics not shared by "mouse-like" signals. These additional characteristics include the ability to distinguish tracing a path along a set of points and individually touching those points in sequence as well as the ability to touch multiple points at once on some devices (a.k.a., multi-touch").

d. In the case of the motion sensitive Wii Remote controller, an unstable form of down the barrel pointing is achieved. However, in order to do so, the device contains an infra-red sensitive camera to detect the location of infra-red LEDs near a graphical display. As described herein, one embodiment of the present invention does not require the use of a camera in the held device or LEDs at the display.

e. In the case of the motion-sensitive PlayStation Move™ controller:
  i. the device employs an externally mounted camera and a large internally illuminated colored ball on the end of the controller in order to localize the device; and
  ii. the device provides motion-controller-like signals for software components (e.g., video games) listening for and responding to motion controller-like-signals, not touch-surface-like. There has been no known use of the device to provide "touch-surface-like" signals for software components principally listening for "touch-surface-like" signals.

f. Examples of external game controllers containing joysticks and buttons, such as the Zeemote™, are already used to control software components running on touch-screen devices. However, the signals from game controller devices are not used in place of touch-screen-signals, but are instead provided as joystick-like, game-controller-like or direction-pad-like signals and usable only by the subset of software components that explicitly listen for those types of signals. In contrast, one aspect of this invention is the ability to provide an alternative source of touch surface signals that can be used to control all of the functions of software components listening to touch-surface-like signals.

Another aspect of this invention relates to the transformation of joystick and button signals to replace a touch surface. A touch surface is commonly overlaid over a graphical display. The position of a touch is highly important, as is the association of the touched position with respect to the frame of the graphical display. In the case of an alternative input device, visual feedback to the user to indicate where on the graphical display an action will occur or has occurred may be missing, neither might there be a provision in an operating system of the device or application to receive the signals from the alternative input device and present them graphically.

Still another aspect of this invention is the graphical presentation of a pointed position of an alternative input device on the display. This aspect differs from:
  a. the graphical display of a cursor from mouse-like signals (being the visualization of a source of mouse-like-signals, not touch-surface-like signals);
  b. the graphical display of the touched position of a touch-sensitive-surface (being the visualization of the touch-surface-like signals, actually originating from an actual touch-sensitive-surface, not an alternative input device); and
  c. the graphical display of other kinds of motion controller, joystick or button signals (being devices whose signals are not transformed to replace touch-surface-like signals).

There may be no single transformation of signals from a new input device that works appropriately as input for a multitude of contexts (e.g., home screens, settings for a display screens, games, operating system functions, etc.) without the knowledge of which transformation should be applied in which context. For one software component, one may desire to use a joystick in order to cause a touch-surface-like signal that simulates the touching of the surface at a specific location in order to simulate the press of a graphical on-screen button. For a different software component, the joystick signals may be transformed to cause the scrolling of an on-screen list by the generation of a time-series of touch-surface-like signals that simulate the signals of an upwards stroke of the touch surface. In either case, the sending of the signals for one case in the context of the other may yield undesired effects.

Still another aspect of this invention is that the choice of transformation of signals from the alternative input device may be determined dynamically based upon a contextual identifier. For example, a user interface API may receive a touch-surface-like signal and transform that signal to higher-level signals. A rule related to the transformation may exist: "If the graphical interface configuration X is loaded specifying a graphical button be placed at position Y in the display, and a touch-surface signal has been received which is within the bounds of the button, then send the 'Button Pressed' signal to the application".

"X AND Y" from the above paragraph is a context in which a transformation of the touch surface signal into a different kind of signal is applied. This differs from the present invention in that:
  1. the transformation is from a signal (non touch-surface-like) or an alternate input device signal into touch-surface-like signal(s); and
  2. The choice of transformation in this example is not dynamic, but fixed with an application X (e.g., distributed with, compiled into or provided by, or designed into the application by the authors of the application X).

More broadly, this aspect of the present invention differs from related art concerning the transformation of signals from one type into another in that:
  1. the signals to be transformed are not touch-surface-like signals and specifically originate from an alternative input device, not being a source of touch-surface-like signals;
  2. part of the context has identified (implicitly or explicitly) the presence of an alternative input device;

3. the transformed signals are used to replace signals from a touch-surface, and subsequently provided to software components configured to listen for the touch-surface-like signals; and 4. the controlled software component needs have no existing provision for configurability.

Still another aspect of this invention is that a transformation of signals may be chosen based upon a context and applied with or without an existing provision for such (e.g., by an application, a user interface API or operating system). That is to say that there is no requirement for a software component to be designed or redesigned to permit dynamic configuration of the input transformation. This property allows one embodiment of the invention to be applied universally to all applications without modification of any of the applications. This differs from the prior art in that the prior art is not dynamically reconfigurable.

Generally speaking, this invention describes techniques for using a motion controller as an input device for an existing electronic device, the controlled device, previously configured for taking inputs in a different form. The signals from the input device are in a different form from the controlling device. According to one aspect of the present invention, the controlled device was designed to respond to signals from a touch screen or touch screen-like signals. The inputs from the motion controller are converted into touch-screen like signals that are then sent to the controlled device or programs being executed in the controlled device to cause the behavior of the controlled device to change or respond thereto.

Referring now to the drawings, FIG. 1 shows an exemplary configuration 100 according to an embodiment of the invention. The primary components in this embodiment include a controlling device 101 and a controlled device 102. The controlling device 101 provides signals derived from motion sensors enclosed therein and any combination of button sensors, joystick sensors, LEDs, and microphone inputs. These signals are interpreted to control the controlled device 102 which may be composed of several elements including a large display 103 and a touch surface input device 104. An exemplary controlling device may be a dedicated controller, a smart phone or other hand-held computing device (e.g., iPhone). An exemplary controlled device may be a television, a game console, or a computing device being used to control an application (e.g. a smartphone or a tablet connected to a television).

In one embodiment, the controlling device 101 includes motion sensors (not shown) and none, one or more LEDs that are housed in a body intended to be hand held by a user 109, shown here in his or her living room, seated comfortably on a couch 110. For this purpose, in one embodiment, the controlling device 101 also contains a communication device and a self-contained power source. This communication device is a Bluetooth radio device in one embodiment, but could be replaced by an infra-red communication device or any other form of wireless communication device in alternate embodiments. In one embodiment, a rechargeable battery is used as the power source.

In another embodiment, the motion signals of the controlling device 101 may be replaced or complemented by signals derived from an external camera that is not attached to the controlling device 101, along with one or more LEDs or other point light sources on the controlling device 101 in view of the camera and motion sensors on the controlling device 101.

Figure 2:
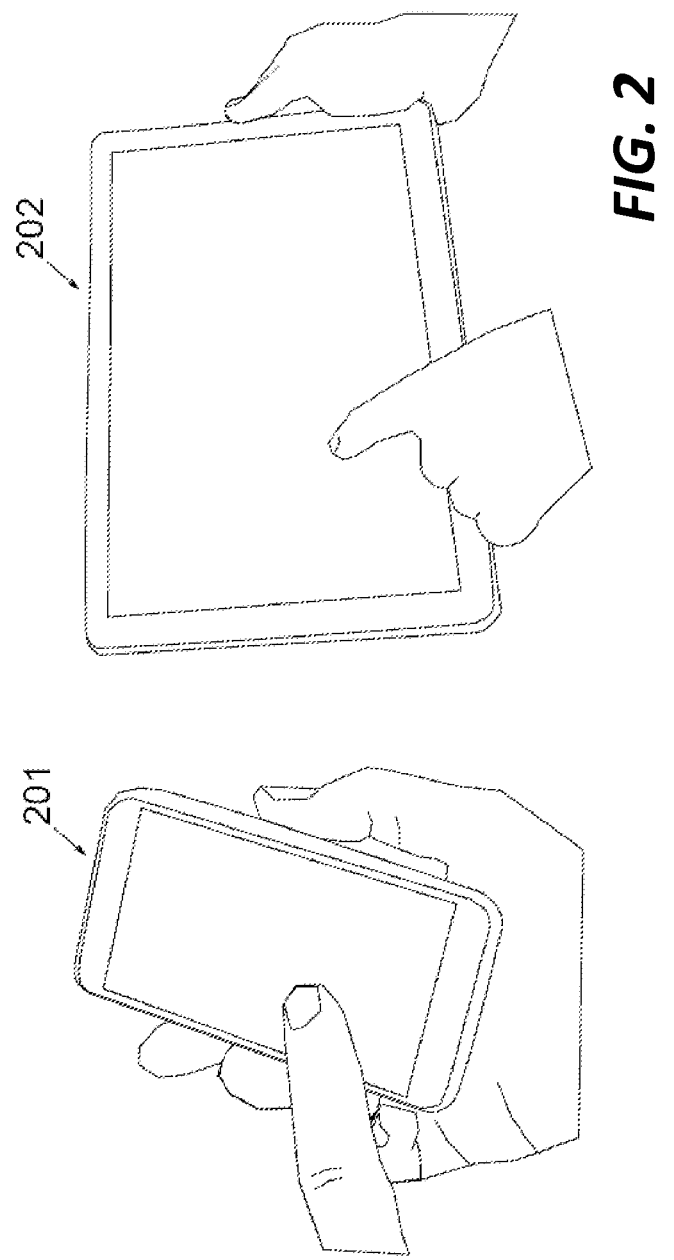
FIG. 2 shows two examples of touch surface input devices.

The controlling device 101 may also be interchangeably referred to as a motion controller when describing various embodiments. In one embodiment, the controlled device 102 is an electronic device configured to execute some modules (e.g., software components) communicating with or controlled by at least a touch-sensitive input device (e.g. a touch screen) or touch-surface-like input device signals. Touch-sensitive input devices include resistive or capacitive touch panels over a graphical display. Two examples are shown in FIG. 2, a smart phone with a touch screen 201 and a tablet computer 202. Touch-surface-like signals are signals describing at least the touched positions or touched points or areas of a 2D plane.

The controlled device 102 may be additionally controlled by any combination of button sensors, keyboard or keypad inputs, joystick sensors, camera or video inputs, microphone inputs, or motion sensors. In one embodiment, the controlled device 102 includes a large display 103 such as a television, computer monitor, or projected display device along with at least one touch surface input device 104 attached directly to the display 103 by means of a cable 105, such as an HDMI cable. In another embodiment 300 shown in FIG. 3, the controlled device 302 includes a touch surface device 304 placed into a docking station associated with the display 103 and connected by wire to the processor of that display 103.

Figure 4:
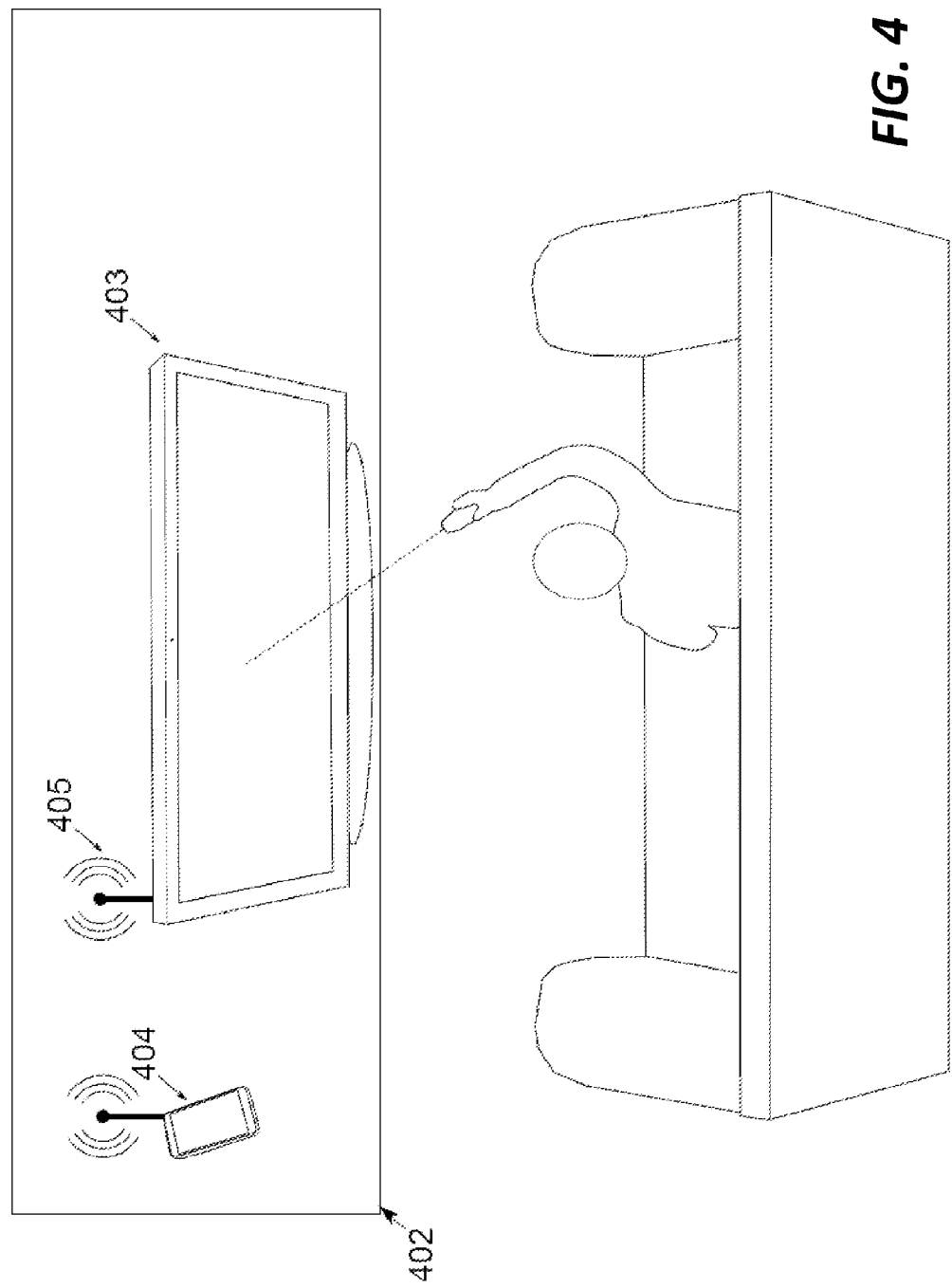
FIG. 4 shows yet another alternate embodiment of the invention with a different method of connecting components.

In yet another alternate embodiment 400 shown in FIG. 4, the controlled device 402 includes a touch surface device 404 that communicates with the display 403 by wireless communication with a receiver/transmitter 405 attached physically to or incorporated into the display.

Figure 3:
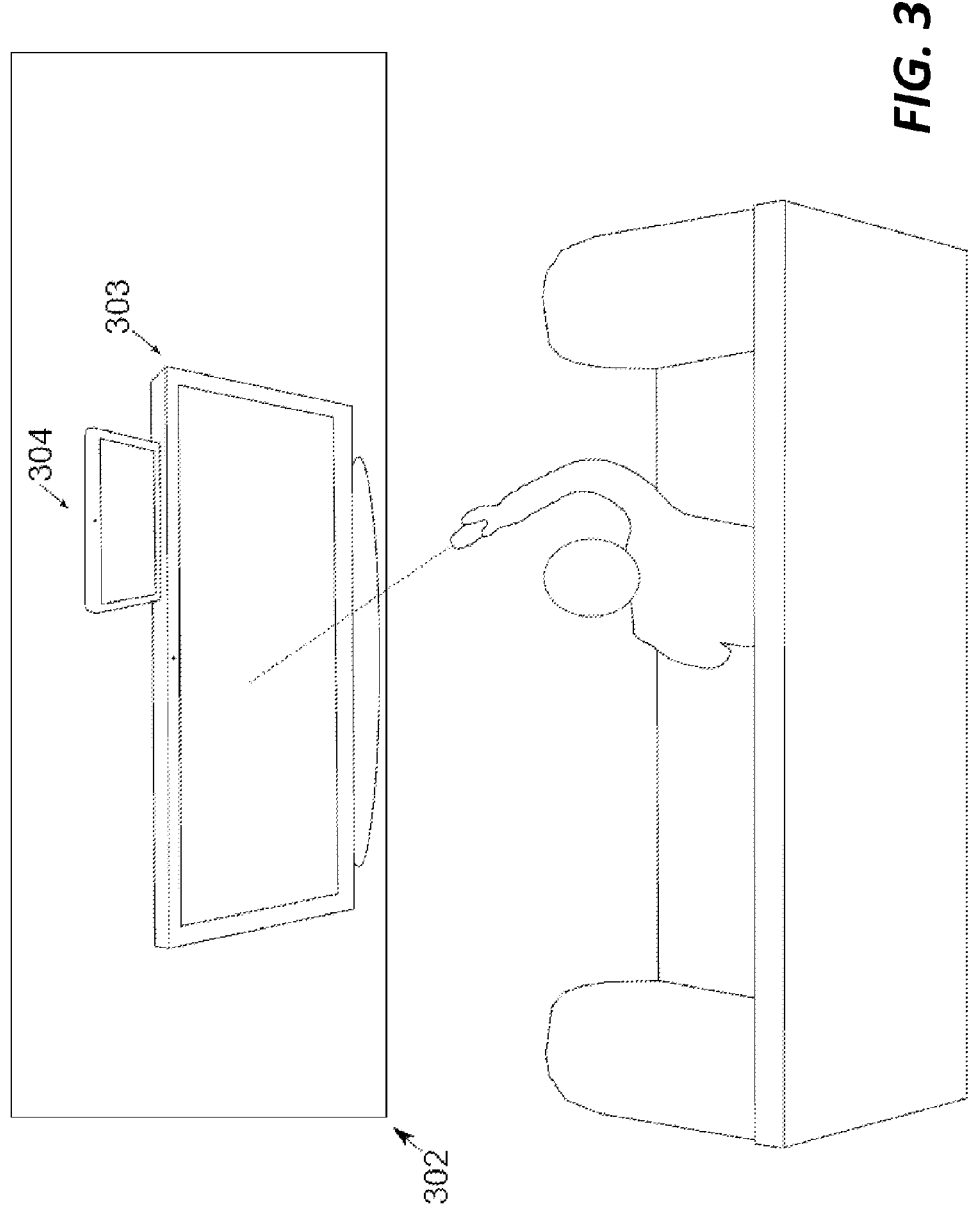
FIG. 3 shows an alternate embodiment of the invention with a different method of connecting components.
Figure 5:
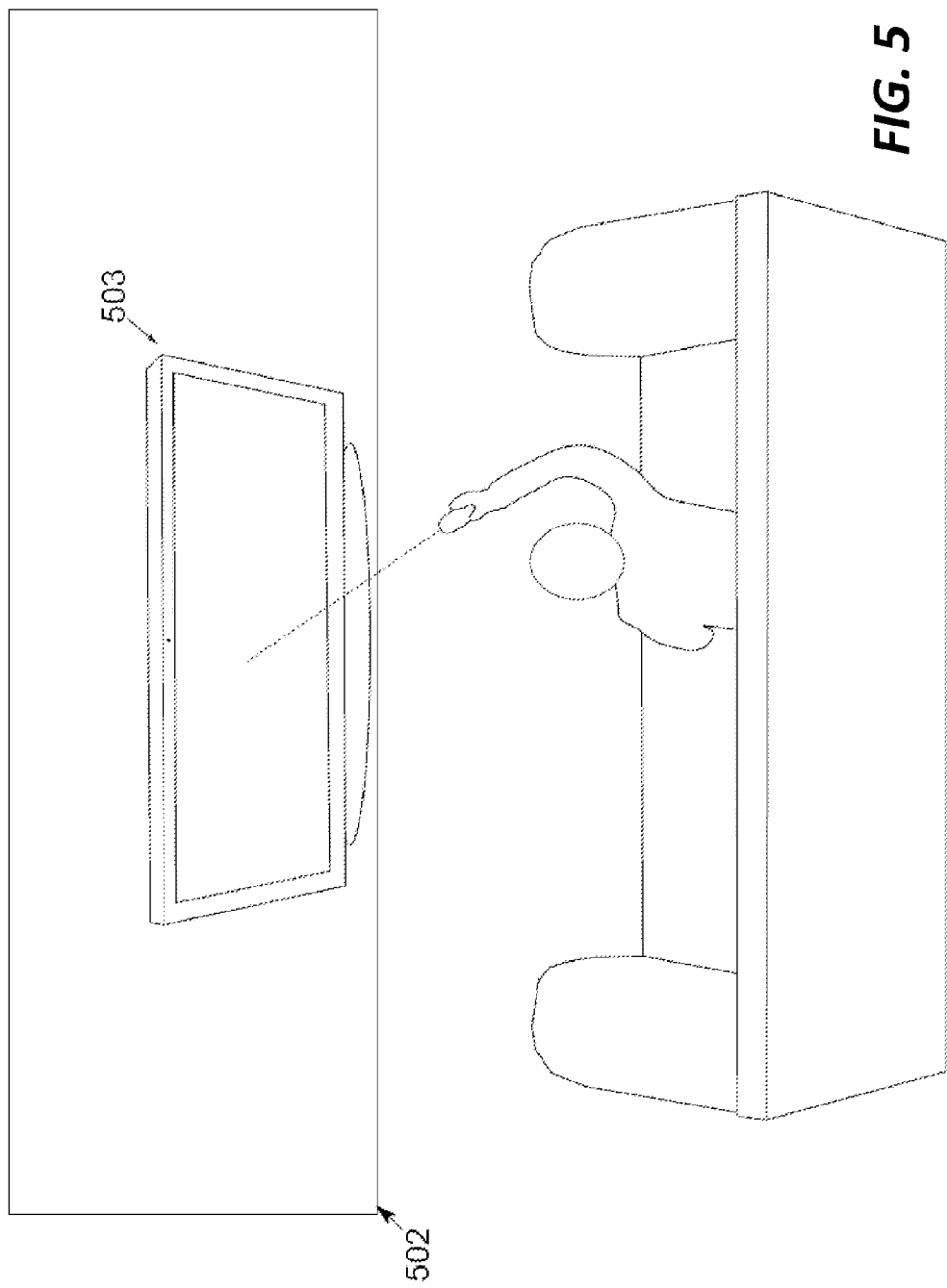
FIG. 5 shows still another alternate embodiment of the invention with a subset of the components.

In each of the embodiments shown in FIGS. 2, 3 and 4, video signals are transmitted from the touch screen device to the display device. In another embodiment 500 shown in FIG. 5, the controlled device 502 does not have a touch-screen but still runs applications controllable by touch-surface-like signals. In this case, the controlling device may be used as a method to control the applications by transforming its signals (being not touch-screen-like) into touch-screen signals usable to control those applications.

Figure 6:
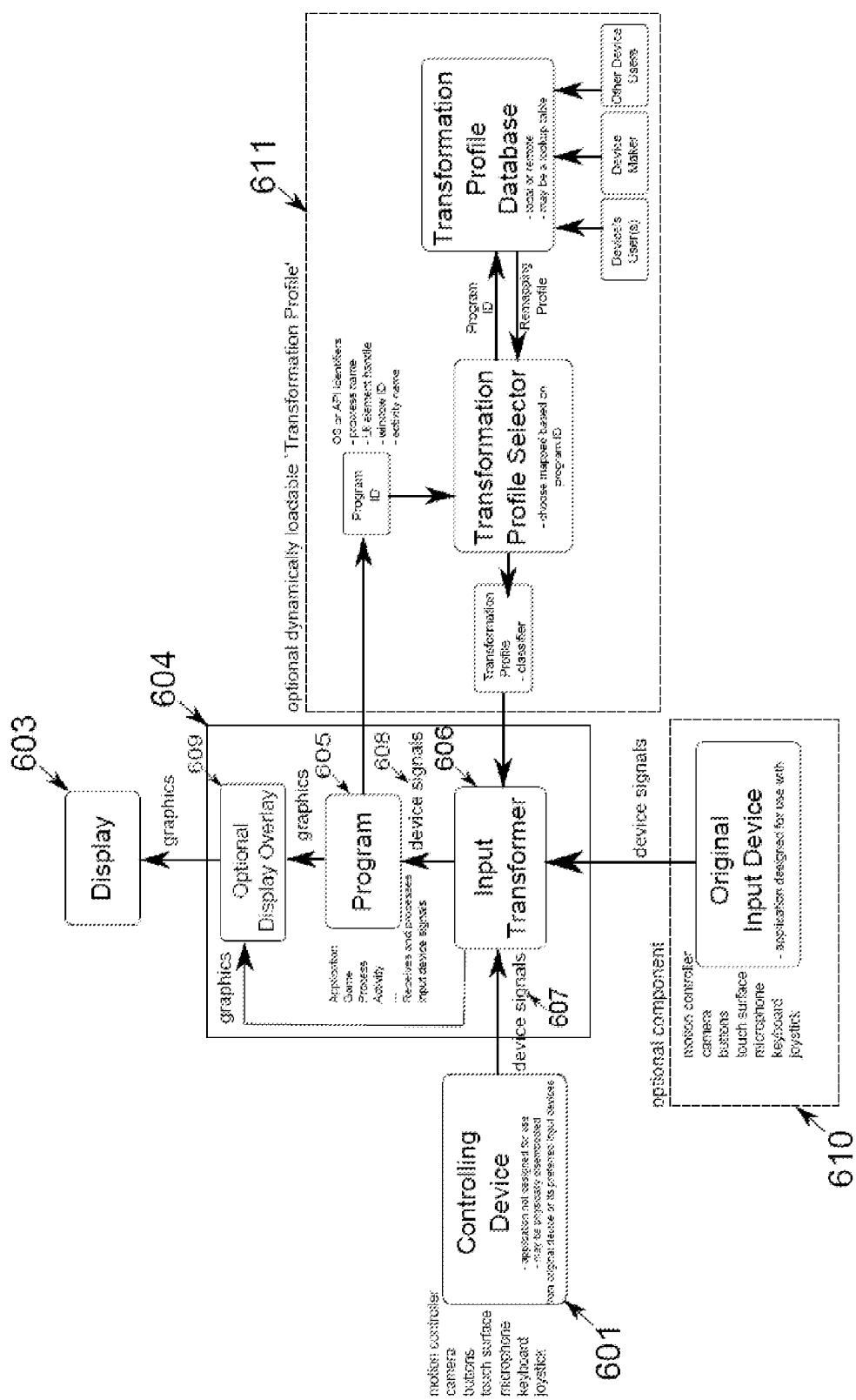
FIG. 6 shows a flowchart demonstrating signal flow within the invention.

FIG. 6 demonstrates how control flows through one embodiment of the invention to enable this control using a controlling device 601. The controlled device includes one or more processing units 604 with the capability to run programs or software modules. The processing unit(s) may be found within the display device, or the touch screen input device, or both. In a preferred embodiment, a processing unit is located in a touch screen input device. In another embodiment, the display device is a television containing the processing unit and controlled software components.

As shown in FIG. 6, signals from the controlling device 601 are used to control software components 605 running in the controlled device 601. The software components are configured to listen for signals of particular types or identifiable categories. Examples include:

touch-screen-like signals button-like signals joystick-like signals text-like signals (e.g. such as a sequence of characters used to fill in a graphical text input field; or a sequence of control signals, such as may be received from a keyboard, or other similar text input device)

signals representing events; for example, "Home button pressed".

signals representing requests; for example, "Scroll down requested".

In each case, the source of the signals may be unknown, but the software components running in the controlled device are configured to "listen-for" or are otherwise controlled by signals of specific types or of identifiable categories. As used herein, signals that are "X-like" are referred to as the signals received by the software components that cause the behavior change of the device running the software components as if the device is controlled by an input device X, but not necessarily originating from the device X.

One aspect of this invention is to allow one or more software components to be controlled by signals of specific types or of identifiable signal categories:
- in the absence of the physical device of the indicated category; and/or
- in addition to the physical device of the indicated category; and/or
- as an alternative mechanism to the physical device of the indicated category.

As an example, in one embodiment of this invention, the invention permits the remote control of a plurality of software components running on a controlled device, where a touch screen is the primary source of input, and the software components are controllable by the touch screen or touch-surface-like signals.

The controlling device may be used as a method to control those software components by transforming its signals 607 (being not touch-surface-like) into touch-surface-like signals 608 usable to control those software components. In a preferred embodiment, this transformation is performed by a software module 606, referred to as an input transformer, running in a processing unit within the touch screen input device.

In another embodiment, the input transformer 606 is able to perform additional transformations on signals. A transformation is specifically related to input signals directly or indirectly derived from the controlling device 601 (including, in some embodiments, signals derived in part from an external camera, but still requiring signals from the controlled device), into output signals of types useable to control the software components and applications running in the controlled device.

Depending on implementation, a wide variety of transformations are possible and appropriate for the categories of input signals available from the controlling device and categories of signals the software components in the controlled device are responsive to. Exemplary transformations include:
- transforming a joystick signal from the controlling device into "Page Up" signal(s);
- transforming microphone signal from the controlling device into text-input signals;
- transforming inertial signals from the controlling device into inertial-like signals after performing an optional rotation to simulate a re-mapping of the axes of the inertial sensors between the input and target device (possibly replacing input from the inertias of the controlled device, if it has any);
- transforming motion signals from the controlling device into touch-surface-like signals.
- transforming motion signals from the controlling device into button-like signals.
- transforming motion signals from the controlling device into joystick-like signals.
- transforming joystick signals from the controlling device into joystick-like signals.
- transforming joystick signals from the controlling device into touch-surface-like signals.
- where those touch-surface-like signals simulate the touch of an on-screen directional controller such as the one shown in FIG. 7, at 704.
- where different joystick directions result in the simulation of different touch surface positions
- where those touch-surface-like signals are a series of touch signals simulating the stroke of a touch surface
- transforming the joystick signals from the controlling device into software signals requesting scrolling of a graphical object or list.
- transforming microphone inputs from the controlling device into touch-surface-like signals (e.g. "Down" (spoken) into simulated downward swipe of touch surface)
- transforming microphone inputs from the controlling device into button-like signals (e.g. "Home" (spoken) to HOME_BUTTON_PRESSED_SIGNAL)
- jointly transforming joystick and button signals from the controlling device into touch surface-like signals.
- jointly transforming motion signals and button signals from the controlling device into touch surface-like signals.
- jointly transforming motion signals and button signals from the controlling device into touch surface-like signals and button-like signals.

In many of the cases above, incoming signals from the controlling device are transformed to replace or modify signals of the controlled device. The transformations may not prevent in all cases the control of the software components by other physical devices, where they may exist (such as 610), but instead to allow the remote control of the software components by the controlling device. The remote control may be initially enabled by detecting some event indicating a desire of the user to use such an alternate controller. Example possible events include:
- the detection of a connection event by cable, docking, or radio contact by the controlling device to the controlled device;
- the detection of the controlled device by radio or other wireless communication channel; or
- the detection of a user by a camera coupled to the controlled device.

In another embodiment, the transformation occurs on the controlling device and the output signals thereof are transmitted directly to the controlled device. In a preferred embodiment, the controlled device is a network-enabled television, being a device capable of receiving and showing video received from an Internet source, or running games, or other networked applications. In the preferred embodiment shown in FIG. 1, an image of the screen of the touch sensitive input device 104 is shown on the display 103. The user 109 then aims the motion controller 101 at the screen in order to specify corresponding 2D positions 107 for the touch screen device. The selection of these positions corresponds to the "Down the Barrel" pointing 106 of the controlling device.

One embodiment of this invention is a method for transforming sensor signals from a motion controller, when used as described above, into touch-surface-like signals. The graphical display shows a "pointed position" as an on-screen element (such as a cursor). The pointed position follows the motion of the motion device by the transformation of the motion signals from the motion device into points on a 2D plane.

There are several methods for transforming the motion signals of the controller into positions on the screen exist. In one embodiment, the inventors use a ray-casting method as described in co-pending U.S. application Ser. No. 12/835,750 which is hereby incorporated by reference. In order to properly achieve "Down the Barrel" pointing, two main kinds of information are needed. First, an accurate absolute orientation of the controller in the world frame is derived, where the world frame is defined with respect to the direction of the gravity field of the Earth and magnetic north. Second, a mapping from the reference frame of the controller to the display is defined. This mapping includes the relative position of the display in relation to the controller as well as the relative rotation of the display with respect to the world frame. This second set of information can be obtained with an initial setup calibration stage. One method of doing this is described in the co-pending U.S. application Ser. No. 12/835,750, where the user points at multiple positions on the display screen with the controller in order to establish the mapping.

In one embodiment, the controlling device generates sensor signals corresponding to at least three orthogonal accelerometer readings, three orthogonal gyroscope readings, and a compass reading with at least one measurement orthogonal to the gravity vector of the Earth. When the controller is at rest, two of the three components of its orientation can be calculated by measuring the direction of the gravity vector using the accelerometers as described in U.S. Pat. No. 7,953,246, which is hereby incorporated by reference. The third component is the rotation around the gravity vector and can be measured directly from the compass. It is understood that these direct measurements of the orientation will not always be available, so the gyroscope sensors provide accurate measurements of angular velocities around each of the three axes over time. These velocities can be integrated to calculate the changes in orientation over time between estimates from gravity and the compass. It is noted that the cumulative integration of the gyroscope readings will accumulate error, known as drift, over a period of time. In order to keep an accurate "Down the Barrel" estimate of orientation, it will be necessary to regularly adjust the orientations back towards the direct estimates available from gravity and the compass. In practice, the gravity and compass readings tend to have lower precision and more noise than the gyroscope readings, resulting in less accuracy in their estimation of the orientation, but are not subject to accumulated error over time or drift. To get the best estimate of orientation, it is necessary to blend these two types of data. A simple method for handling this blending is to smooth the corrections to the integrated orientations by moving them in small increments towards the gravity and compass estimates. More complex methods are available to practitioners including Kalman filters and other known methods for filtering and combining noisy signals.

Alternately, all three components of orientation can be calculated from the compass if a three-axis compass is present within the controlling device. In another embodiment, a compass with at least three orthogonal readings is used in place of the gyroscope. For an accurate enough compass, the readings can be used as a direct estimate of orientation of the controller in the world frame. Errors in the orientation can be reduced by smoothing (averaging) the outputs of multiple readings in order to prevent the user experiencing a jittery cursor when trying to point.

In still another embodiment, both the orientation and relative location of the display to the controller can be jointly obtained and updated over time with the use of an external camera in a defined relationship to the display and a light source on the controller visible to that camera as described in co-pending US application Ser. No. 13/105,863 which is hereby incorporated by reference.

Given the orientation and relative position of the controller, ray-casting provides a straightforward operation to find the intersection point between the ray originating at the controller and aligned along its orientation with the display. In one embodiment, when only more limited sensors are available, relative pointing is used instead of "down-the-barrel" pointing. In this embodiment, the gyroscope readings from the Motion Controller are mapped directly to relative changes in the location of a cursor on the screen in order to generate the pointed positions, removing the need to have accelerometers, compass sensors, LEDs, or an external camera.

Next we describe how to combine these 2D intersection points, pointed positions, with other signals (e.g., action signals) from the controlling device in order to generate touch-surface-like signals according to one embodiment.

The details of the operation modes described below are intended to be illustrative rather than limiting in their application. When holding a button is described, similar methods such as depressing a trigger or covering a touch, light, or capacitive sensor may be used instead. When a rotation around an axis is described, a different choice of axis or rotation direction may be used if felt to be more comfortable or natural for the user given the input device.

Without loss of generality, let us assume the presence of at least two buttons on a motion device, labeled button A and button B. Single touch selection: pressing and releasing button A on the motion device while holding the device steady generates the signals of simulating the touch and release of the touch-surface at the pointed position. Single touch drag: pressing button A down on the motion device, followed by moving and/or rotating the controller, and finally releasing the button generates a series of signals simulating a touch-press at the pointed position when the button was first depressed, then a drag through the pointed positions calculated until the button was released, followed by a touch-release.

Dual-touch drag: pressing button B down on the motion device, followed by moving and/or rotating the controller, and finally releasing the button generates a series of dual signals simulating a stationary touch with constant position at the pointed position when the button was first depressed, as well as a drag through the pointed positions calculated until the button was released, followed by a touch-release for both positions. This functionality allows a simple one-button method for the user to simulate multi-touch signals sufficient to allow several common uses in touch-surface-devices such as zooming in or out on a display or rotating an image.

For more complicated multi-touch interactions, an alternate mode could be enabled that requires the user to use sequences of two buttons to simulate an arbitrary number of simultaneous pointed positions and strokes as detailed below.

Multi-touch selection: Pressing button B on the motion device, saves the coordinates of a pointed position. Pressing button B additional times will save additional pointed positions. Pressing button A afterwards for a single touch selection will then generate a multi-touch event corresponding to each of the saved pointed positions as well as the pointed position when button A was pressed.

Multi-touch drag: As described for Multi-touch selection, except ending with a Single touch drag event will generates two or more series of signals simultaneously:

1) simulated touch signals as in the single touch drag case; and 2) a second set of simulated touch signals with constant position for each of the stored pointed position(s) from the previous location(s) when Button B was pressed.

Multi-touch multi-drag: As described for Multi-touch drag above, except a time series of data is stored for the pointed positions while Button B is held. The saved time series is then combined with the current pointed positions while Button A is held to generate two or more series of signals simultaneously:

1) simulated touch signals as in the single touch drag case; and 2) a second set of simulated touch signals corresponding to the sequence of stored pointed positions from while the B button was pressed.

An alternate embodiment uses multiple controllers to generate multiple pointed positions simultaneously, these positions can then be combined to produce multi-touch selection and drag signals directly.

In one embodiment, the pointed position on the display device is mapped back to its corresponding position on the touch surface input device when generating touch surface signals. For embodiments without a touch screen device, the 2D pointed position on the display is used directly to generate a touch-like signal for the software components. Additional transformations and methods of user interaction with the program will be used in alternate embodiments including some subset of the following:

Graphical Overlay While Button Held and Select At Release: Pressing and holding a button causes the appearance of various graphical elements (buttons, lists, texts, boxes, etc. . . . ), generated and displayed by the Display Overlay software component 609. At the release of the button any graphical element represented at the pointed position has its function activated and the graphical overlay disappears.

Volume control: pressing and holding a button on the controlling device enters a volume change mode. Rotating the tip of the controller to the right (when viewed from above, looking down) causes the volume to increase. Rotating the tip of the controller to the left (when viewed from above, looking down) causes the volume to decrease.

Scrolling left and right: Pressing and holding a button on the controlling device causes a change in the position of displayed graphical elements. Horizontal motions of the tip Motion Controller (i.e. the left/right motion of the tip of the controller, when viewed from above), cause the horizontal motion of graphical elements.

Scrolling up and down: Pressing and holding a button causes a change in the position of displayed graphical elements. Vertical motions of the tip of the motion controller (i.e. the up/down motion of the tip of the controller, when viewed from the side), cause the vertical motion of graphical elements.

Gesture control: If the user makes a motion of a recognizable type, it may generate a corresponding simulated signal for a software event or request such as "Press Home button", "Scroll Up", "Save Changes", "Cancel", or similar recognizable signals previously defined for the software component.

Gesture control to touch: If the user makes a motion of a recognizable type, it may generate a series of touch-surface signals corresponding to a pre-defined series of pointed positions. The series of positions could be defined either by the application, or a previous set of generated touch-signals by the user. For example the user could specify a sequence of pointed positions using one of the single or multi-touch methods detailed above and then specify that that sequence should be associated with motions similar to an example motion or set of motions they provide.

Audio control: If the user makes a recognizable audible signal generate a corresponding simulated software event or request signal such as "Press Home button", "Scroll Up", "Save Changes", "Cancel", or similar recognizable signals previously defined for the software component.

Audio Volume Control: Use the volume of the audio input from the user to control the output volume of the controlled device. For example, one could decide to match the decibel level of the two.

Audio to Text Input: The transformation of audio signals from the controlling device to provide or replace text input to software components running on the controlled device. In one embodiment the transformation is implemented using an existing Text to Speech API, such as the Google Android Text To Speed API.

Motion to Keyboard-like Input: The transformation of motion control signals from the controlling device to provide or replace touch input providing text input to software components running on the controlled device. In one embodiment the transformation is from button and motion signals into touch-surface-like signal simulating the selection of the keys shown on an on-screen keyboard.

Motion to Text Input: In another embodiment, the transformation is from button and motion signals into touch-surface-like signal simulating the drawing of words by passing the pointed position through the on-screen symbols representing elements of the chosen word. A disambiguation method is required. In the preferred embodiment we rely upon existing software components, such as Swype.

Another aspect of the invention includes the dynamic choice of a transformation of signals from a controlling device into signals provided to software components on a controlled device based on a Profile, where:
  a Profile includes a context and a transformation;
  a context is an identifiable situation in which the transformation should be applied;
  a transformation is as described above.

FIG. 7 shows a motivating example of why a dynamic mapping of transformations would be desired. Consider two cases with an identical setup for the controlled device and controlling device 701 and an identical signal 702 from the user corresponding to pushing a joystick up. If the running application is a game 703, the desired mapping may be a series of touch signals corresponding to a single touch 704 at the location corresponding to an on-screen virtual gamepad, whereas if the running program is an address book 705, the desired output may be a vertical upwards stroke 706 to scroll the list of names.

A profile further represents the dynamic application of the transformation within the specified Context. That is to say, if the Context applies, take the sensor signals from the controlling device, apply the transformation, and provide the resulting signals to software components running on the controlled device.

Examples of the contexts include, but are not limited, to:
  the status of identified graphical user interface elements (windows, screens, boxes, buttons, sliders, etc. . . . )
Example Profile:
  IF (A scroll bar element is currently displayed) THEN Transform the joystick signals from the controlling device into touch surface signals causing Scroll Up or Scroll Down.
  active software processes
Example Profiles:
  IF (Photo Gallery Photo Viewer Application is Running) THEN Transform motion sensor signals into touch surface signals causing Zoom In or Zoom Out.
or,
  IF (Photo Gallery Photo Viewer Application is Running) THEN Transform motion sensor signals into touch high level signals explicitly representing Zoom In or Zoom Out.
  IF (some game is currently running) THEN Transform (motion signals from the controlling device into simulated motion signals of the controlled device).
  the detection of a controlling device
Example Profile:
  IF (controlling device is detected AND any other conditions) THEN Transform joystick signals of the controlling device representing a forward push into a touch surface signals simulating an upwards stroke.

the detection of any motion of the controlling device:
Example Profiles:
IF (controlling device motion was detected)
THEN (Transform A into B)
IF (controlling device motion was detected AND other contexts detected)
THEN (Transform A into B);
IF (A display graphical element for text input is selected)
THEN Transform audio signals from the controlling device into text input.
IF (the controlling device is held in a vertical orientation)
THEN Transform audio signals from the controlling device into text input.

In one embodiment, a Profile is implemented as programming code, which may (possibly after compilation and linking steps), be executed on the Controlled or controlling device.

Figure 8:
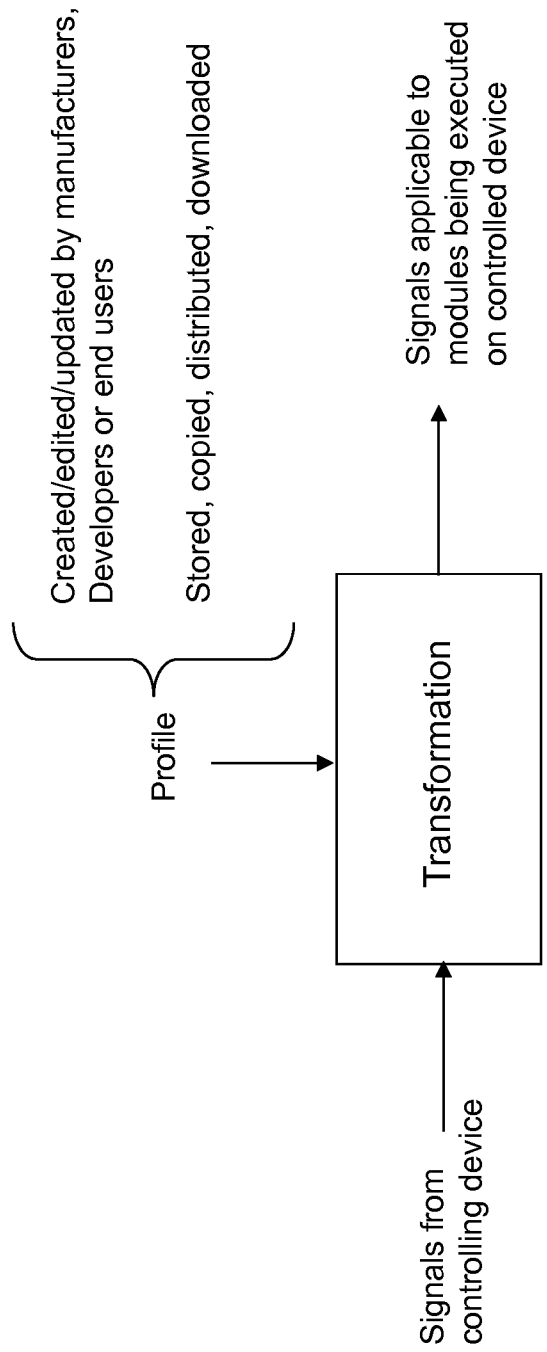
FIG. 8 shows a functional block diagram of transformation.

In the preferred embodiment, Profiles are represented as computer data and so are readily stored, copied, edited, modified, entered into databases or transmitted electronically. In this case, the functions of the Profile are performed by an additional software component 611 that may load the Profile. FIG. 8 shows a functional block diagram.

Figure 9:
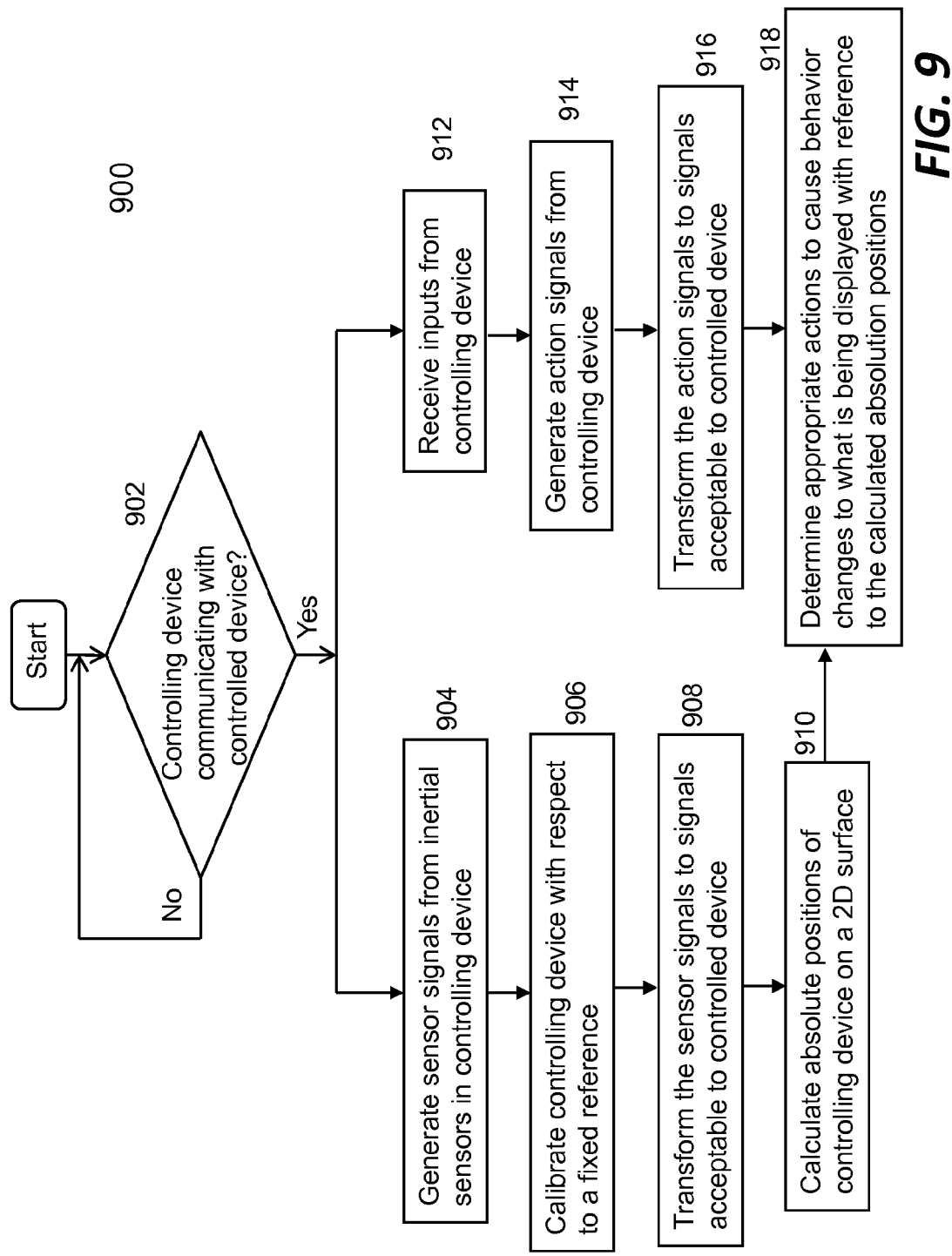
FIG. 9 shows a flowchart or process of how a controlling device (e.g., a motion sensitive device) is being used to interact with a controlled device, where signals from the controlling device are mapped to signals acceptable to the controlled device.

According to one embodiment of the present invention, FIG. 9 shows a flowchart or process 900 of how a controlling device (e.g., a motion sensitive device) is being used to interact with a controlled device, where signals from the controlling device are mapped to signals acceptable to the controlled device. As described above, the mapping or transformation may be performed in accordance with a profile. Depending on implementation, the process 900 may be implemented in software or a combination of software and hardware.

At 902, the process 900 checks if a controlling device (e.g., iPhone) is able to communicate with a controlled device (e.g., a smart TV). The communication may be conducted in one of many ways, such as WiFI, Bluetooth, or infrared. The purpose is to ensure that signals from the controlling device can be received by the controlled device. The process 900 can proceed when the signals from the controlling device can be received by the controlled device. At 904, a user of the controlling device moves the controlling device around. As described above, the controlling device includes a set of sensors, at least some of them are inertial sensors that generate motion signals. At 906, the controlling device is calibrated, such as the measurement of the orientation of the controlling device while the device is pointed at a display of the controlled device. Thus it is initially possible to provide down-the-barrel pointing.

The sensor signals are transformed according to a transformation. Depending on implementation, the transformation may be implemented in different ways, some of which have been described above. One of the functions for the transformation is to transform the sensor signals (along with action signals) to substantially similar to the control signals the controlled device is designed for. For example, the controlled device is designed to be controlled by control signals from a touch-screen device or to receive input signals from a touch-screen device. The transformation can be designed in one embodiment to transform some or all of the sensor signals to substantially similar to the control signals from the touch-screen device. As a result, the controlling device can be used to control the controlled device.

To fairly accurately point at the display, the absolute positions of the controlling device on the 2D surface of the display are calculated at 910 with respect to a reference frame (e.g., with respect to the display). On the other side, the controlling device may also generate other signals. Typically, the controlling device can be interfaced with a user to receive a command and an input at 912. The device may also include one or more keys or buttons to activate an action. Thus, besides the sensor signals from the sensors in the controlling device, there are action signals that may also from the controlling device at 914. Similar to 908, the action signals are transformed to substantially similar to the action signals the controlled device can accept at 916. In one embodiment, both the sensor signals and the action signals are transmitted to the controlled device at the same time depending on how the user desires to control the controlled device. Together with the pointing positions from 910, the action signals can cause a behavior change to the controlled device at 918.

For example, a user needs to scroll a menu with a few items, where the menu is displayed on the controlled device. Thus it is necessary to determine the pointing positions of the controlling device on the display so as to determine which item is being pointed at. An action (e.g., a click) on the controlling device causes the controlling device to send out an action signal that shall be transformed to an action acceptable by the controlled device. With the determine locations, the controlled device is configured to determine which item in the menu is being selected and shall be activated.

Figure 10:
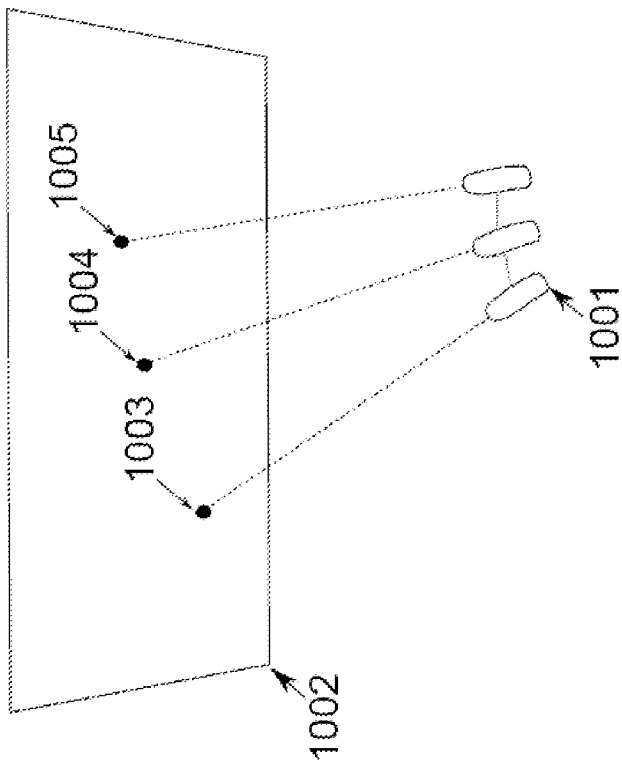
FIG. 10 shows an exemplary projection of a tracking of a motion controller in 3D space to a set of successive points on a 2D plane, where the 2D plane represents a display screen of a controlled device.

FIG. 10 shows an exemplary projection of a tracking of a motion controller in 3D space to a set of successive points on a 2D plane, where the 2D plane represents a display screen of a controlled device. An aspect of this invention is the ability to download Profiles to the controlled device via the Internet. Another aspect of this invention is the ability to load Profiles onto the Controlled device:

after the release of the device;

following the detection of a new Context, (new Profiles are dynamically downloaded to configure the transformation of inputs provided to new software components);

Another aspect of this invention is the ability for Profiles to be created or configured. Possible creators include controlled device makers, controlling device makers, operating system makers, and users of the controlled device. Possible methods for creating or configuring Profiles include the generation of software or through the use of a graphical interface. Another aspect of this invention is the ability for users to share customized Profiles. In the preferred embodiment, the sharing happens via an Internet connection to a remote database. In another embodiment, the users download the Profiles from a website or other network location. In another embodiment, the users share the Profiles directly with one another through a networking protocol.

One aspect of this invention is the dynamic changing of the method of user input based on the orientation of the controlling device. As an example, consider a possible use of this invention to control a racing game application. The racing game is a controlled device software component controlled by any motion signals causing steering and acceleration of a vehicle, and also touch-surface-like signals to select on-display graphical elements. When the controlling device is pointing towards the graphical display, the input method is a pointing interface allowing the selection of on-screen graphical elements by the transformation of the motion and button signals of the controlling device into touch-surface-like signals. When the controlling device is held perpendicular to the display, the input method is changed (by dynamically choosing a new transformation) so that the motion signals of the controlling device are transformed into motion signals.

One aspect of this invention is that different types of transformation of the signals of the controlling device may be applied based upon the orientation of the controlling device.

One aspect of this invention is that different types of transformation of the signals of the controlling device may be applied based upon the orientation of the controlling device with respect the location of the controlled device, another external device, camera, or display.

One aspect of this invention is that different transformations of the motion signals may occur if the controlling device is oriented to point to the left of the display than if oriented pointing to the right of the display, controlling device or camera.

One aspect of this invention is the use of the orientation of the controlling device as context information to decide when to apply different transformations of the signals of the controlling device.

The above description of the invention has focused on the transformation of signals from the controlling device to the software components running on the controlled device. In may be desirable to additionally alter the outputs from the software components before displaying them to the user. An optional component for adding graphical overlays including input feedback information such as a cursor or additional buttons was shown in FIG. 6 at 609. For some controlled devices additional transformations of the output data could be used to improve the user experience given the new controller. Examples of additional transformations of the graphical data include adding additional displayed controls (such as buttons, sliders, or menus) into unused portions of the display. For graphical data coming from a device such as a smart phone in portrait display mode, there may be large unused areas in a display such as a television screen or monitor that can be used to provide additional areas for the user to generate Pointed Points used in output touch-surface signals. Additionally, graphical elements could be removed from the output of the touch-sensitive device and either placed in new configurations (such as to the side of the main display), or removed entirely. Consider a game application with a virtual game-pad at the bottom of the screen. If the input controller has a joystick, there may be no need to display the virtual joypad to the user, making a clearer picture for the user, while still allowing the input joystick signals of the controlling device to be mapped to touch-surface signals corresponding to the position of the controls on the original touch-surface device.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiment.

We claim:

1. A system for motion-based control of a controlled device, the system comprising:
   a motion sensitive device including a plurality of sensors generating sensor signals responsive to motion of the motion sensitive device, the sensor signals being sufficient to estimate positions and orientations of the motion sensitive device in six degrees of freedom, wherein at least one application, being executed on the controlled device, is preconfigured to be responsive to input signals from a touch-screen device;
   a processing unit configured to facilitate the motion sensitive device to control the at least one application on the controlled device by converting a first set of signals from the motion sensitive device to a part of a second set of signals, the second set of signals including some signals substantially similar to the input signals from the touch-screen device, wherein the first set of signals includes the sensor signals; and
   at least one external sensor reference, wherein the estimated positions and orientations of the motion sensitive device are corrected with respect to a signal from the external sensor reference before converting the first set of signals to the second set of signals.

2. The system as recited in claim 1, wherein said converting the first set of signals from the motion sensitive device to the part of the second set of signals includes a transformation from the first set of signals being non-touch-surface-like signals to the part of the second set of signals being touch-surface-like signals.

3. The system as recited in claim 2, wherein the transformation includes an operation of augmenting or replacing at least some of the touch-screen input signals of the touch-screen device.

4. The system as recited in claim 2, wherein the second set of signals is used to control one or more functions of the controlled device configured to be controlled by the touch-screen device.

5. The system as recited in claim 4, wherein the one or more functions include some or all of content searching, browsing, navigating, selecting and controlling an application that the touch-screen device is used to control in the controlled device.

6. The system as recited in claim 1, wherein the controlled device includes a display, and the at least one application is being displayed on the display of the controlled device.

7. The system as recited in claim 6, wherein the controlled device is coupled to the touch-screen device, and the at least one application is being executed in the touch-screen device.

8. The system as recited in claim 7, wherein the first set of signals is remotely received in the touch-screen device, behaviors of the controlled device are controlled by the motion sensitive device via the touch-screen device.

9. The system as recited in claim 6, wherein the processing unit is included in the controlled device, and the first set of signals is remotely received in the controlled device.

10. The system as recited in claim 1, wherein the estimated positions and orientations of the motion sensitive device are corrected with respect to a fixed sensor reference before converting the first set of signals to the second set of signals.

11. The system as recited in claim 10, wherein the second set of signals includes a series of signals from multi-touch interactions by a user with the motion sensitive device.

12. The system as recited in claim 1, wherein the external sensor takes images of the motion sensitive device.

13. The system as recited in claim 12, wherein the external sensor reference includes a video stream from a video camera.

14. The system as recited in claim 1, wherein the processing unit is further configured to map a frame of reference of the motion sensitive device to a frame of reference of a display of the controlled device.

15. The system as recited in claim 14, wherein the positions and orientations of the motion sensitive device in six degrees of freedom are continuously mapped to the frame of reference of the display to allow down-the-barrel pointing at the display to control at least one object being displayed on the display.

16. The system as recited in claim 1, wherein the touch-screen device is one of a tablet, a smart phone, and an electronic device with a touch-screen input element.

17. The system as recited in claim 16, wherein the controlled device is one of a television, a monitor, a projected graphics system and a computing device with a display.

18. The system as recited in claim 17, wherein the at least one application controls a digital video recorder (DVR), a streaming movie system, a game, a live TV, or a visual application accessible on a TV.

19. The system as recited in claim 1, wherein the sensor signals are first transformed to motion-based gestures before being further transformed to the part of the second set of signals to control the controlled device, allowing gesture-based control of the at least one application responsive to the input signals from the motion sensitive device.

20. A method claim for motion-based control of a controlled device, the method comprising:
    generating in a motion sensitive device a set of sensor signals responsive to motion of the motion sensitive device, the sensor signals from a plurality of sensors enclosed in the motion sensitive device and being sufficient to estimate positions and orientations of the motion sensitive device in six degrees of freedom;
    converting a first set of signals from the motion sensitive device to a part of a second set of signals to control at least one application being executed on the controlled device, the second set of signals including some signals substantially similar to touch-screen input signals from a touch-screen device, wherein the first set of signals includes the sensor signals, and the controlled device is designed to be responsive to the touch-screen input signals from the touch-screen device; and
    receiving a signal from at least one external sensor reference, wherein estimated positions and orientations of the motion sensitive device are corrected with respect to the signal before converting the first set of signals to the second set of signals.

21. The method as recited in claim 20, wherein said converting a first set of signals from the motion sensitive device to a part of a second set of signals includes a transformation from the first set of signals being non-touch-surface-like signals to the second set of signals being touch-surface-like signals.

22. The method as recited in claim 21, wherein the transformation includes an operation of augmenting or replacing at least some of the touch-screen input signals of the touch-screen device.

23. The method as recited in claim 22, wherein the second set of signals is used to control one or more functions of the controlled device that is configured to be controlled by the touch-screen device.

24. The method as recited in claim 23, wherein the one or more functions include some or all of content searching, browsing, navigating, selecting and controlling an application that the touch-screen device is used to control in the controlled device.

25. The method as recited in claim 20, wherein the controlled device includes a display, and the at least one application is being displayed on the display of the controlled device.

26. The method as recited in claim 25, wherein the controlled device is coupled to the touch-screen device, and the at least one application is being executed in the touch-screen device.

27. The method as recited in claim 26, wherein the first set of signals is remotely received in the touch-screen device, behaviors of the controlled device are controlled by the motion sensitive device via the touch-screen device.

28. The method as recited in claim 20, wherein the controlled device includes a processing unit, and the first set of signals is remotely received in the controlled device to be converted to the second set of signals.

29. The method as recited in claim 20, wherein the estimated positions and orientations of the motion sensitive device are corrected with respect to a fixed sensor reference before converting the first set of signals to a part of the second set of signals.

30. The method as recited in claim 29, wherein the second set of signals includes a series of signals from multi-touch interactions by a user with the motion sensitive device.

31. The method as recited in claim 20, wherein the at least one external sensor takes images of the motion sensitive device.

32. The method as recited in claim 31, wherein the external sensor reference includes a video stream from a video camera.

33. The method as recited in claim 20, further comprising mapping a frame of reference of the motion sensitive device to a frame of reference of a display of the controlled device.

34. The method as recited in claim 20, wherein the controlled device includes a display, and further comprising mapping continuously the positions and orientations of the motion sensitive device in six degrees of freedom to a frame of reference of the display to allow down-the-barrel pointing at the display to control at least one object being displayed in the display.

35. The method as recited in claim 34, wherein the touch-screen device is one of a tablet, a smart phone, and an electronic device with a touch screen input element.

36. The system as recited in claim 35, wherein the display is one of a television, a monitor, a projected graphics system and a computing device with a display.

37. The system as recited in claim 36, wherein the at least one application controls a digital video recorder (DVR), a streaming movie system, a game, a live TV, or a visual application accessible on a TV.

38. A method for motion-based control of a controlled device, the method comprising:
    receiving a first set of sensor signals from sensors in a motion sensitive device, the sensor signals being sufficient to estimate positions and orientations of the motion sensitive device in six degrees of freedom;
    receiving a second set of sensor signals from a secondary sensor that provides a fixed frame of reference;
    determining, from the first and second sets of signals, pointing locations of the motion sensitive device relative to the fixed frame of reference, wherein said determining pointing locations of the motion sensitive device comprises:

correcting the estimated positions and orientations of the motion sensitive device with respect to the second sets of signals; and deriving the pointing locations of the motion sensitive device from the corrected estimated positions and orientations of the motion sensitive device with respect to the fixed frame of reference; and producing a set of control signals from a transformation to control the controlled device, wherein the transformation is configured to transform at least some of the control signals to some of the control signals substantially similar to input signals from a predefined device provided to control the controlled device.

39. The method as recited in claim 38, wherein the secondary sensor is an external sensor disposed with respect to a display of the controlled device.

40. The method as recited in claim 39, wherein the external sensor is an LED sensor, a magnetometer or a camera.

41. The method as recited in claim 38, further comprising mapping the pointing locations of the motion sensitive device to corresponding positions on a display of the controlled device.

42. The method as recited in claim 38, wherein the secondary sensor is provided to monitor an area substantially covering movements of the motion sensitive device.

43. The method as recited in claim 42, wherein the sensors in the motion sensitive device include a plurality of inertial sensors.

44. The method as recited in claim 43, wherein at least one application is being executed and displayed on the display of the controlled device.

45. The method as recited in claim 43, wherein at least one application being executed in the controlled device is designed to listen for and respond specifically to touch-surface-like signals, and wherein the at least some of the control signals are the touch-surface-like signals.

46. The method as recited in claim 45, wherein the at least one application is executed with one or more software components to perform mouse functions in responding to the at least some of the control signals.

47. The method as recited in claim 43, wherein at least one application being executed in the controlled device is designed to listen for and respond specifically to one or more of touch-screen-like signals, button-like signals, joystick-like signals, and text-like signals.

48. The method as recited in claim 47, wherein the touch-surface-like signals contain information representing 2D coordinates on a 2D surface.

49. The method as recited in claim 38, wherein the transformation is provided as a convenience to application programmers who are now freed from having to consider a large variety of input devices subsequently used to control the controlled device.

50. The method as recited in claim 49, wherein the transformation is configured to determine dynamically the first set of signals from the motion sensitive device based upon a contextual identifier before the first set of signals is transformed.

51. The method as recited in claim 49, wherein the transformation is configured to transform joystick or button signals of the motion sensitive device into at least some of the control signals.

52. The system as recited in claim 43, wherein the controlled device is coupled to a touch-screen device, and the at least one application is being executed in the touch-screen device, and wherein the first and second sets of signals are remotely received in the touch-screen device, behaviors of the controlled device is controlled by the motion sensitive device via the touch-screen device.

53. The method as recited in claim 52, wherein said generating a set of control signals from a mapping to control the controlled device comprises: augmenting or replacing at least some of touch-screen inputs of the touch-screen device to subsequently control behavior in at least one application being executed on the controlled device.

54. The method as recited in claim 38, further comprising causing the motion sensitive device to initiate an initial calibration setup before the first set of sensor signals from sensors in the motion sensitive device is used to estimate the positions and orientations of the motion sensitive device in six degrees of freedom.

55. The method as recited in claim 54, wherein the pointing locations are transformed to navigate and interact with a menu displayed on the controlled device.

56. The method as recited in claim 55, wherein absolute pointing locations are combined with button press inputs to the motion sensitive device, and transformed to provide multi-touch touch-screen inputs to the controlled device.

57. The method as recited in claim 54, wherein a context from the controlled device includes information pertaining to an application being displayed on a display of the controlled device and a current pointing location of the motion sensitive device, and further comprising modifying any subsequent touch-screen inputs that are used to control the application.

58. The method as recited in claim 57, wherein a hierarchy of contexts is available for different categories of applications so that other applications run immediately without recalibration of the motion sensitive device.

59. The method as recited in claim 38, wherein the set of control signals includes a series of signals from multi-touch interactions by a user with the motion sensitive device.

60. The method as recited in claim 59, wherein the series of signals include dual signals simulating a stationary touch with constant position at a pointed position by the motion sensitive device when a button on the motion sensitive device is first depressed, followed by dragging the motion sensitive device through the pointed position until the button is released.

61. The method as recited in claim 60, wherein the series of signals allow one-button activations by the user to simulate multi-touch signals sufficient to allow several common uses in a touch screen device for zooming in or out on a display or rotating an image being displayed.

62. The method as recited in claim 38, wherein the control signals includes signals from one or more other motion sensitive devices pointing at several positions of the display simultaneously, the positions are then combined to produce a multi-touch selection.

* * * * *